(12) United States Patent
Wu et al.

(10) Patent No.: US 11,470,238 B2
(45) Date of Patent: Oct. 11, 2022

(54) TEAM PHOTOGRAPHING METHOD AND APPARATUS, AND STORAGE MEDIUM

(71) Applicant: BEIJING XIAOMI MOBILE SOFTWARE CO., LTD., Beijing (CN)

(72) Inventors: Xiaojun Wu, Beijing (CN); Darning Xing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 44 days.

(21) Appl. No.: 16/905,885

(22) Filed: Jun. 18, 2020

(65) Prior Publication Data
US 2021/0281765 A1 Sep. 9, 2021

(30) Foreign Application Priority Data
Mar. 4, 2020 (CN) .......................... 202010144221.1

(51) Int. Cl.
*H04N 5/232* (2006.01)
*G06T 7/80* (2017.01)

(52) U.S. Cl.
CPC ......... *H04N 5/232127* (2018.08); *G06T 7/80* (2017.01); *H04N 5/232061* (2018.08)

(58) Field of Classification Search
CPC ....... H04N 5/232127; H04N 5/232061; H04N 5/23206; H04N 5/23218; H04N 2201/0013; H04N 2201/0031; H04N 2201/0032; H04N 2201/0039; H04N 2201/0074; H04N 2201/0075; H04N 1/00244; H04N 1/00347; H04N 5/247; H04N 1/00307; G06T 7/80
See application file for complete search history.

(56) References Cited

U.S. PATENT DOCUMENTS

| | | | |
|---|---|---|---|
| 9,521,398 B1 * | 12/2016 | Woodman | ............ H04N 13/286 |
| 2006/0170958 A1 | 8/2006 | Jung et al. | |
| 2009/0013005 A1 | 1/2009 | Hung | |
| 2009/0201377 A1 | 8/2009 | Okano | |
| 2014/0002683 A1 | 1/2014 | Muraki et al. | |
| 2014/0354852 A1 | 12/2014 | Won et al. | |
| 2014/0362246 A1 | 12/2014 | Nakano et al. | |
| 2015/0116518 A1 * | 4/2015 | Fu | ..................... H04N 5/232123 |
| | | | 348/208.6 |

(Continued)

FOREIGN PATENT DOCUMENTS

CN 103369229 A 10/2013

OTHER PUBLICATIONS

OA for EP application 20187600.0, mailed on Sep. 23, 2020.
OA for CN application 202010144221.1, mailed on Apr. 19, 2022.

*Primary Examiner* — Mekonnen D Dagnew
(74) *Attorney, Agent, or Firm* — Syncoda LLC; Feng Ma (57) ABSTRACT

A team photographing method can be applied to terminals. The terminals can include a main terminal and at least one member terminal. The method includes: forming a team including the main terminal and the at least one member terminal based on a team photographing instruction initiated by the main terminal; based on a target object to be photographed determined by the main terminal, determining the target object to be photographed of the at least one member terminal; and controlling, by the main terminal, the main terminal and the at least one member terminal to photograph the target object to be photographed cooperatively.

14 Claims, 5 Drawing Sheets

(56) References Cited

U.S. PATENT DOCUMENTS

| | | | |
|---|---|---|---|
| 2015/0281549 A1* | 10/2015 | Fridental | H04N 21/84 348/211.3 |
| 2016/0014320 A1 | 1/2016 | Feltham et al. | |
| 2017/0054968 A1 | 2/2017 | Woodman et al. | |
| 2017/0094196 A1 | 3/2017 | Adsumilli et al. | |
| 2017/0171452 A1 | 6/2017 | Spielberg | |
| 2019/0191099 A1 | 6/2019 | Kren | |

* cited by examiner

TEAM PHOTOGRAPHING METHOD AND APPARATUS, AND STORAGE MEDIUM

CROSS-REFERENCE TO RELATED APPLICATION

This application claims priority to Chinese Patent Application No. 202010144221.1 filed on Mar. 4, 2020, the disclosure of which is hereby incorporated by reference in its entirety.

BACKGROUND

With the development of electronics technologies, smart mobile terminals have become more and more popular in users' daily lives. Processing capacity and camera performance of the mobile terminals become increasingly powerful, and photographing image quality also becomes higher. Due to simple operations and convenient use of photographing functions of the mobile terminals, it is common for users to take photos and videos using the mobile terminals.

SUMMARY

To overcome problems existing in the related art, the present disclosure provides a team photographing method and apparatus, and a storage medium.

According to a first aspect of embodiments of the present disclosure, a team photographing method is provided, which is applied to terminals. The terminals include a main terminal and at least one member terminal. The method includes: forming a team including the main terminal and the at least one member terminal based on a team photographing instruction initiated by the main terminal; based on a target object to be photographed determined by the main terminal, determining the target object to be photographed of the at least one member terminal; and controlling, by the main terminal, the main terminal and the at least one member terminal to photograph the target object to be photographed cooperatively.

According to another aspect of embodiments of the present disclosure, a team photographing apparatus is provided, which is applied to terminals. The terminals include a main terminal and at least one member terminal. The apparatus includes: one or more processors; a memory storing instructions executable by the one or more processors; in which the one or more processors are configured to: form a team including the main terminal and the at least one member terminal based on a team photographing instruction initiated by the main terminal; based on a target object to be photographed determined by the main terminal, determine the target object to be photographed of the at least one member terminal; and control, by the main terminal, the main terminal and the at least one member terminal to photograph the target object to be photographed cooperatively.

According to another aspect of embodiments of the present disclosure, a non-transitory computer readable storage medium is provided. When instructions in the storage medium are executed by a processor of a mobile terminal, the mobile terminal is configured to execute the team photographing method according to present disclosure. The method includes: forming a team including the main terminal and the at least one member terminal based on a team photographing instruction initiated by the main terminal; based on a target object to be photographed determined by the main terminal, determining the target object to be photographed of the at least one member terminal; and controlling, by the main terminal, the main terminal and the at least one member terminal to photograph the target object to be photographed cooperatively.

It is to be understood that both the foregoing general description and the following detailed description are example and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Example embodiments will be described in detail herein, which are illustrated in the accompanying drawings. When the following description refers to the accompanying drawings, the same or similar elements may be denoted by the same number in different accompanying drawings, unless otherwise indicated. The embodiments described in the following example embodiments do not represent all embodiments consistent with the present disclosure. Instead, they are merely examples of apparatus and methods consistent with aspects of the present disclosure as detailed in the appended claims.

When a dynamic image is photographed, users may desire to capture more abundant information, and to photograph a same photographing object from multiple perspectives, achieving overall richer display effects.

Figure 1:
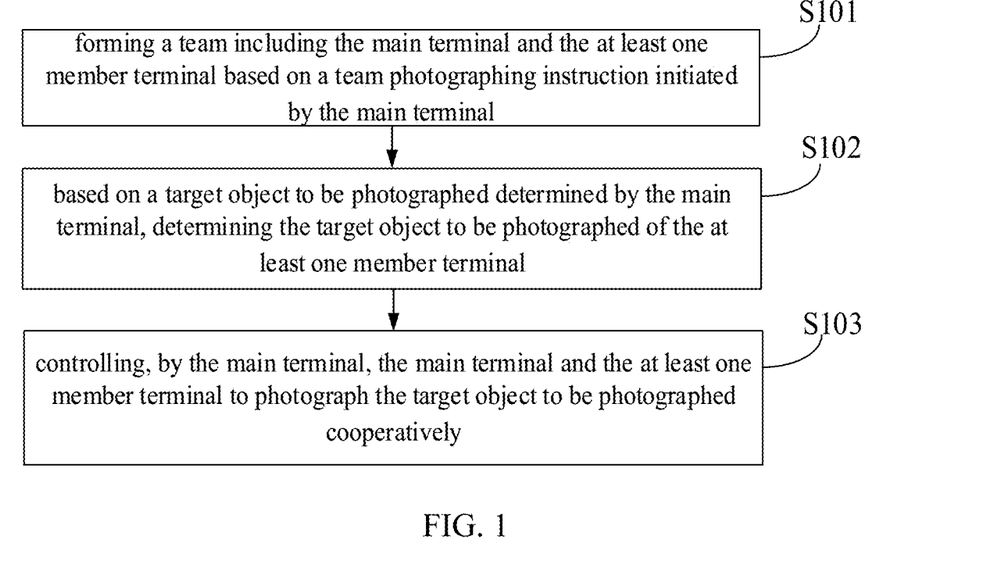
FIG. 1 is a flowchart illustrating a team photographing method according to some embodiments of the present disclosure.

FIG. 1 is a flowchart illustrating a team photographing method according to some embodiments of the present disclosure. As illustrated in FIG. 1, the method is applicable to terminals. The terminals can be, for example, a smart phone, a tablet computer, a wearable device or a PC (personal computer). Embodiments of the present disclosure do not limit a type of the terminal to which a photographing method is applied. Embodiments of the present disclosure can be applied to photograph an image and a video. The terminals include a main terminal and at least one member terminal. Referring to FIG. 1, the photographing method includes the followings.

At block 101, a team including the main terminal and the at least one member terminal is formed based on a team photographing instruction initiated by the main terminal.

In embodiments of the present disclosure, in order to photograph a target object to be photographed in multiple angles, the team including the main terminal and the at least one member terminal is formed to complete the photographing cooperatively. In the team, the main terminal can be a main control terminal for photographing, and control the at least one member terminal to photograph a same target object to be photographed. The main terminal and the at least one member terminal may photograph the target object to be photographed from different angles. The main terminal and the at least one member terminal need to form a photographing team to implement the photographing together. A first terminal and a second terminal may photograph the target object to be photographed from different angles. The main terminal and the at least one member terminal form the team, responding to the team photographing instruction initiated by the main terminal. After the team including the main terminal and the at least one member terminal is successfully formed, the member terminal may share a photographing preview image of the target object to be photographed to the main terminal, and the main terminal may browse the photographing preview image of the member terminal to control the team to photograph the same target object to be photographed.

In some embodiments, member terminals in the team may share the photographing preview image of the target object photographed by a terminal in the team, which is convenient for exchange and communication between the main terminal and the member terminals during photographing and better implements the photographing in the team.

At block S102, based on a target object to be photographed determined by the main terminal, the target object to be photographed of the at least one member terminal is determined.

The main terminal is taken as the main control terminal for photographing. the target object to be photographed is determined for the main terminal, for example, by the user's manual operation or in other manners, and the target object to be photographed can be determined for the at least one member terminal based on the target object to be photographed determined by the main terminal, such that the main terminal and the at least one member terminal in the team photographs the same target object to be photographed.

At block S103, the main terminal controls the main terminal and the at least one member terminal to photograph the target object to be photographed cooperatively.

When the main terminal and the at least one member terminal in the team determine to photograph the same target object to be photographed, the main terminal photographs the target object to be photographed, and perform linkage control on the at least one member terminal to photograph the target object to be photographed in real time.

According to embodiments of the present disclosure, the team including the main terminal and the at least one member terminal is formed based on the team photographing instruction initiated by the main terminal, the target object to be photographed of the at least one member terminal is determined based on the target object to be photographed determined by the main terminal, and the main terminal performs linkage control on each terminal in the team to photograph the target object to be photographed, thereby implementing thin the main terminal and the at least one member terminal form the team to photograph the target object to be photographed in cooperation, and further implementing multi-angle photographing for the target object to be photographed.

Figure 2:
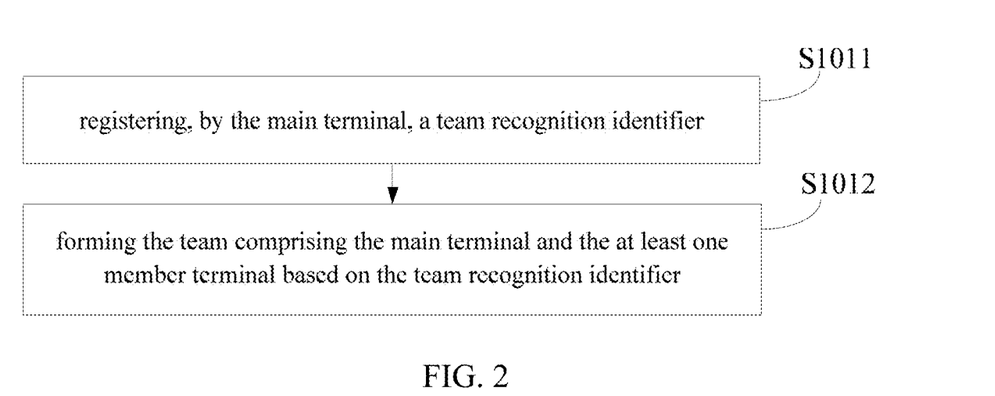
FIG. 2 is a flowchart illustrating a team photographing method according to another example embodiment of the present disclosure.

FIG. 2 is a flowchart illustrating a team photographing method according to some other embodiments of the present disclosure. As illustrated in FIG. 2, actions at block S101 illustrated in FIG. 1 include followings.

At block S1011, the main terminal registers a team recognition identifier.

With the team photographing instruction initiated by the main terminal, the at least one member terminal forms a team based on the team photographing instruction initiated by the main terminal, and the main terminal may register in a server through a network to generate the team recognition identifier, namely a team id. The team id is used as a recognition identifier for a team photographing, such that a main terminal and at least one member terminal corresponding to a same team id form a team to implement the team photographing for the target object to be photographed.

At block S1012, the team including the main terminal and the at least one member terminal is formed based on the team recognition identifier.

The main terminal shares the team id to the at least one member terminal, so as to form the team. The main terminal may share the team id to the at least one member terminal by social communication application or software, or by generating a two-dimensional code of the team id, such that the two-dimensional code can be shared to enable the at least one member terminal to join the team of the main terminal by scanning the two-dimensional code.

In some embodiments, the target object to be photographed of the at least one member terminal is determined based on the target object to be photographed determined by the main terminal and the photographing preview image of the target object to be photographed by the at least one member terminal.

The main terminal is configured as the main control terminal for the team photographing. At the main terminal, the user may aim a lens at the target object to be photographed, a preview image of the target object to be photographed is generated, such that the target object to be photographed is determined from the preview image, for example, by the user's manual operation. The at least one member terminal in the team also photographs at the target object to be photographed to generate a preview image.

The main terminal and the at least one member terminal may communicate with the server. The server can be a cloud server. The main terminal sends a determined target object to be photographed and the preview image used for determining the target object to be photographed to the cloud server, and the at least one member terminal sends the preview image generated by aiming at the target object to be photographed to the cloud server.

Based on the preview image of the target object to be photographed generated by the member terminal, the target object to be photographed determined by the main terminal, and the preview image for the main terminal determining the target object to be photographed, the cloud server determines a position of the target object to be photographed in the preview image of the member terminal. It should be understood that, based on the preview image sent by the at least one member terminal, the cloud server determines the position of the target object to be photographed in the preview image respectively, such that the at least one member terminal and the main terminal in the team determine the same target object to be photographed in a process of photographing the target object to be photographed at different angles in subsequent, thereby implementing the team photographing for the target object to be photographed.

Figure 3A:
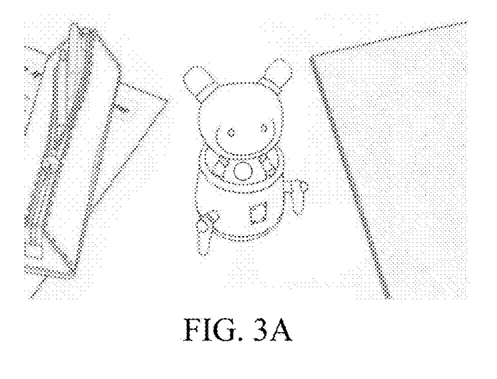
FIG. 3A is a first diagram illustrating determining a target object to be photographed according to some other embodiments of the present disclosure.
Figure 3B:
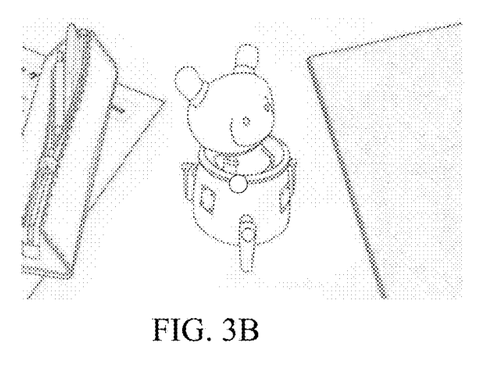
FIG. 3B is a second first diagram illustrating the determining a target object to be photographed according to some embodiments of the present disclosure.

FIG. 3A and FIG. 3B are schematic diagrams illustrating determining a target object to be photographed according to some other embodiments of the present disclosure. FIG. 3A illustrates a preview image of the target object to be photographed by a main terminal, and the target object to be photographed (that is, a doll illustrated in FIG. 3A) determined by a user at the main terminal. FIG. 3B illustrates a preview image of the target object to be photographed by a member terminal. It should be understood that, the main terminal and the member terminal photograph the target object to be photographed from different angles.

The main terminal sends the determined target object to be photographed and the preview image for determining the target object to be photographed to the cloud server, and the at least one member terminal sends the preview image generated by aiming at the target object to be photographed to the cloud server.

Based on the preview image generated by the member terminal for the target object to be photographed as illustrated in FIG. 3B, the target object to be photographed determined by the main terminal, and the preview image for the main terminal determining the target object to be photographed as illustrated in FIG. 3A, the cloud server determines a position of the target object to be photographed in the preview image of the member terminal illustrated in FIG. 3B.

In some embodiments, a Gaussian mixture model is established based on the preview image of the target object to be photographed by the main terminal, and the target object to be photographed of the at least one member terminal is determined based on the Gaussian mixture model and the preview image of the target object to be photographed by the at least one member terminal.

Based on the target object to be photographed determined by the main terminal and the preview image for determining the target object to be photographed, semantic segmentation is performed on the preview image. The semantic segmentation refers to dividing visual input into different semantics, to distinguish different target objects in the preview image.

The Gaussian mixture model is established based on the target object to be photographed determined by the main terminal. The Gaussian mixture model is configured to accurately quantify things using a Gaussian probability density function, and to decompose one thing into a plurality of models formed based on the Gaussian probability density function. In embodiments of the present disclosure, the Gaussian mixture model is configured to establish an image pixel feature model of the target object to be photographed.

According to the established Gaussian mixture model, the target object to be photographed of the at least one member terminal is determined. Referring to a following formula, a parameter formula of the Gaussian mixture model is represented by:

$$p(x) = \Sigma_{k=1}^{K} \pi_k \mathcal{N}(x|\mu_k, \Sigma_k), \Sigma_{k=1}^{K} \pi_k = 1,$$

where, p(x) represents a sum of probability distributions of colors k (k=1, 2, ..., K) in the target object to be photographed multiplied by a coefficient $\pi_k$ representing a proportion of a color distribution in color distributions of the target object to be photographed, K represents the number of color clusters in the target object to be photographed, $\mu_k$ represents mean value of a color x in a Gaussian mixture distribution, and $\Sigma_k$ represents a variance of the color x.

The target object to be photographed of the at least one member terminal is determined based on the Gaussian mixture model, that is, the preview image of the member terminal for the target object to be photographed is divided to into a plurality of regions. Respective regions correspond to different objects in the image. An average confidence value of pixels in each region in the preview image of the target object to be photographed determined by the member terminal belonging to the target object to be photographed determined by the main terminal is calculated.

A region corresponding to a maximum value of the average confidence values is determined as a region in the preview image of the target object to be photographed by the member terminal corresponding to the target object to be photographed determined by the main terminal. A centroid of a geometric shape corresponding to the region is calculated, i.e., a geometric center of the region is calculated, and a position of the centroid is determined as the position of the target object to be photographed by the member terminal. The member terminal performs point focusing on the target object to be photographed based on the received position of the centroid.

Referring to FIGS. 3A and 3B again, the Gaussian mixture model is established based on the preview image (i.e., FIG. 3A) of the target object to be photographed by the main terminal, and a region where the target object to be photographed locates is photographed in FIG. 3B. The centroid of the region is calculated, i.e., a circle position at the doll in FIG. 3B, and the member terminal performs point focusing on the target object to be photographed based on the received position of the centroid to determine the target object to be photographed of the at least one member terminal, i.e. to determine the doll in FIG. 3B as the target object to be photographed of the member terminal.

In some embodiments, a maximum value of pixels of each region in the preview image of the target object to be photographed determined by the main terminal is lower than a confidence threshold, in which, the pixels also belong to the target object to be photographed determined by the main terminal, in the preview image of the target object to be photographed determined by the member terminal, it is difficult to determine the region corresponding to the target object to be photographed determined by the main terminal, and the server controls the member terminal to perform automatic focusing to implement photographing for the target object to be photographed.

A predetermined confidence value threshold can be determined based on an actual use demand of the user. For example, the confidence value threshold can be 0.85, 0.8 or 0.9, etc.

Figure 4:
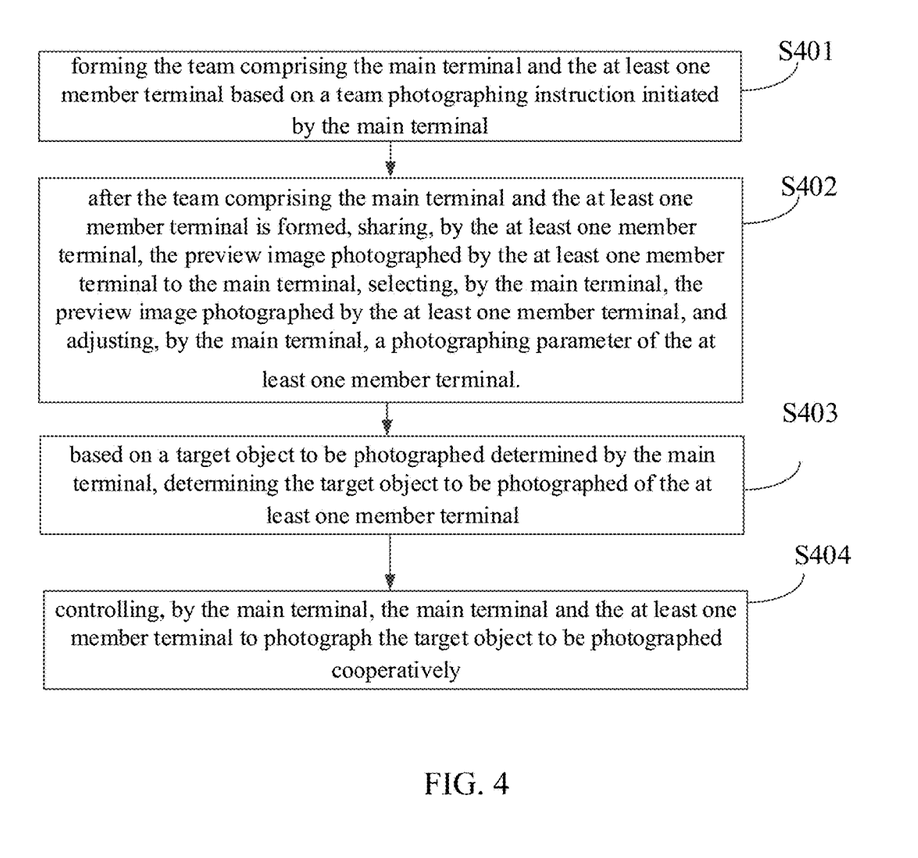
FIG. 4 is a flowchart illustrating a team photographing method according to some other embodiments of the present disclosure.

FIG. 4 is a flowchart illustrating a team photographing method according to some other embodiments of the present disclosure. As illustrated in FIG. 4, the team photographing method includes followings.

At block S401, a team including the main terminal and the at least one member terminal is formed based on a team photographing instruction initiated by the main terminal.

At block S402, after the team including the main terminal and the at least one member terminal is successfully formed, the at least one member terminal shares the preview image photographed by the at least one member terminal to the main terminal, and the main terminal selects the preview image photographed by the at least one member terminal, and adjusts a photographing parameter of the at least one member terminal.

In order to photograph the target object to be photographed by the team including the main terminal and the at least one member terminal, the photographing parameters of the main terminal and the at least one member terminal can be unified. The at least one member terminal shares the preview image photographed by the at least one member terminal to the main terminal, and the preview image photographed by the at least one member terminal for the target object can be viewed at the main terminal, the preview image photographed by the at least one member terminal can be selected and the photographing parameter of the at least one member terminal can be adjusted. The photographing parameter of the at least one member terminal can be adjusted at the main terminal via communication by using social communication software, and adjusting the photographing parameter in the member terminal, or can be adjusting the photographing parameter by controlling the member terminal in the main terminal. The photographing parameter can be, such as, a photographing angle, a photographing shutter speed, a photographing aperture, a photographing focal length, a white balance, etc. of the target object to be photographed determined by the at least one member terminal. By adjusting the photographing parameter of the at least one member terminal, a unification of the photographing parameters of the main terminal and the at least one member terminal in the team is finally implemented.

At block S403, a target object to be photographed of the at least one member terminal is determined based on the target object to be photographed determined by the main terminal.

At block S404, the main terminal controls the main terminal and the at least one member terminal to photograph the target object to be photographed cooperatively.

Figure 5:
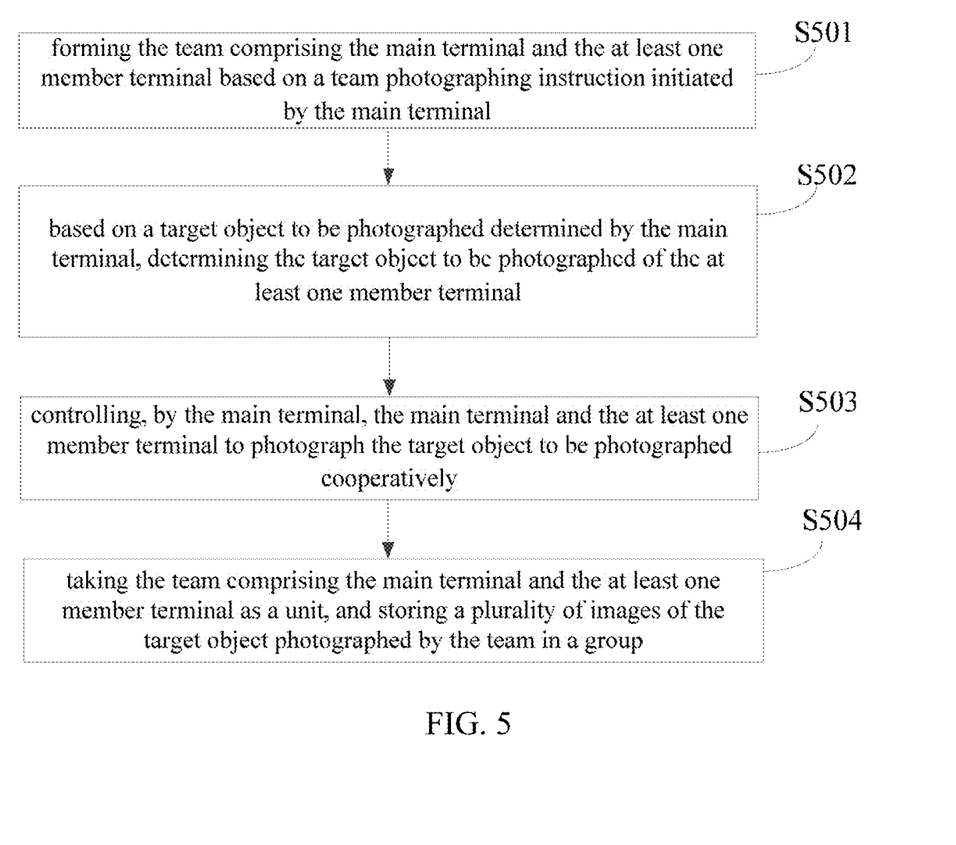
FIG. 5 is a flowchart illustrating a team photographing method according to some other embodiments of the present disclosure.

FIG. 5 is a flowchart illustrating a team photographing method according to some other embodiments of the present disclosure. As illustrated in FIG. 5, the team photographing method includes followings.

At block S501, the team including the main terminal and the at least one member terminal is formed based on a team photographing instruction initiated by the main terminal.

At block S502, based on a target object to be photographed determined by the main terminal, the target object to be photographed of the at least one member terminal is determined.

At block S503, the main terminal controls the main terminal and the at least one member terminal to photograph the target object to be photographed cooperatively.

At block S504, the team including the main terminal and the at least one member terminal is taken as a unit, and a plurality of images of the target object to be photographed by the team are stored in a group.

With the team including the main terminal and the at least one member terminal, a plurality of images of the target object to be photographed by the team are photographed and stored in a group. For the plurality of images of the target object to be photographed, the main terminal and the at least one member terminal may respectively send the images to the server. The images are stored in the group in the server, to facilitate information collection and processing of the images in the group. The main terminal and the at least one member terminal may also store the plurality of images of the target object to be photographed determined by the main terminal or the member terminal in the group.

The main terminal and the at least one member terminal may also store the plurality of images of the target object to be photographed locally in the main terminal and the at least one member terminal respectively. The terminals of the team photographing may share, view and use the photographed images saved locally.

Figure 6:
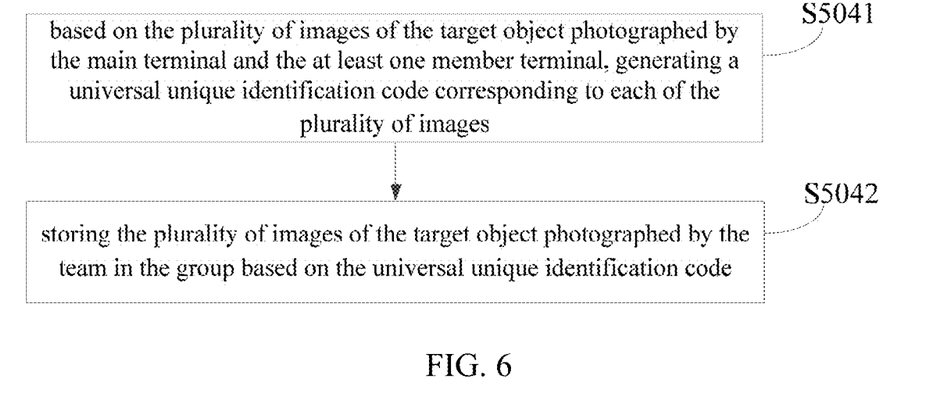
FIG. 6 is a flowchart illustrating a team photographing method according to some other embodiments of the present disclosure.

FIG. 6 is a flowchart illustrating a team photographing method according to some other embodiments of the present disclosure. As illustrated in FIG. 6, actions at block S504 illustrated in FIG. 5 include followings.

At block S5041, based on the plurality of images of the target object photographed by the main terminal and the at least one member terminal, a universal unique identification code corresponding to each of the plurality of images is generated.

At block S5042, the plurality of images of the target object photographed by the team in the group are stored based on the universal unique identification code.

In some embodiments of the present disclosure, based on the plurality of images of the target object photographed by the main terminal and the at least one member terminal, the universal unique identification code corresponding to each of the plurality of images is generated, and the plurality of images of the target object photographed by the team are stored in the group based on the universal unique identification code.

The main terminal and the at least one member terminal send the plurality of images to the server based on the photographed target object, and in order to enhance a relevance of the images of the same target object in a same photographing group, the main terminal and the at least one member terminal may record a universally unique identifier (UUId) for the photographing in an extensible metadata platform (xmp) for the images. The UUId corresponds to the plurality of images taken by the same photographing group for the same target object.

An xmp file records an edition for the image based on an original photographing file of the target object. When the original photographing file is read, the original photographing file can be obtained through parameters recorded in the xmp file and the original photographing file.

The plurality of images of the target object determined by the team including the main terminal and the at least one member terminal are summarized, to generate a group of images of the target object, and the group of images are transmitted to the main terminal and the at least one member terminal. For each terminal in the team, the images of other terminals can be determined by analyzing the xmp file corresponding to each image, thereby implementing to share the images of the main terminal and the at least one member terminal in the team.

In some embodiments of the present disclosure, the main terminal and the at least one member terminal browse the image. The plurality of images in the group are stored in the server, that is, the main terminal and the member terminal only locally store the images of the target object by the main terminal and the member terminal respectively. When the terminal browses the image, a browsing tool may associate the group of images on lease based on an analysis for the xmp file of the images. The user may view and edit the plurality of images in the group in the terminal.

When the plurality of images in the group are stored in the terminal, the browsing tool obtains the plurality of images based on the analysis for the xmp file of the images, such that the user may conveniently view and edit the plurality of images in the group in the terminal.

When the plurality of images in the group for the target object are in a video format, the server may package the images into a multimedia packaging format, such as an mkv format. The multimedia packaging format may accommodate an unlimited number of videos, audios, images or caption tracks in a same file. The user may use the browsing tool to switch a playing track of a photographed video from different terminals when viewing and editing the photographed video.

Based on an inventive concept, the present disclosure also provides a team photographing apparatus.

Figure 7:
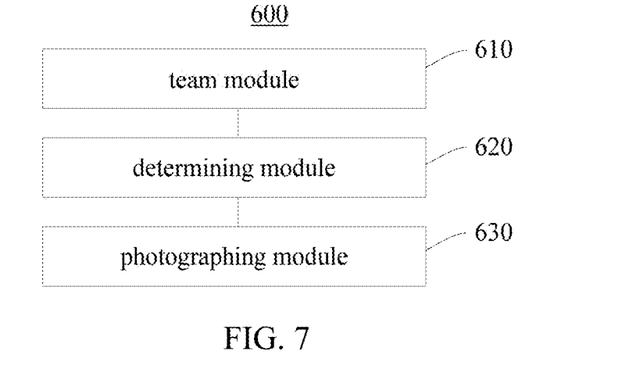
FIG. 7 is a block diagram illustrating a team photographing apparatus according to some embodiments of the present disclosure.

FIG. 7 is a block diagram illustrating a team photographing apparatus according to some embodiments of the present disclosure. The apparatus is applied to terminals. The terminals include a main terminal and at least one member terminal. As illustrated in FIG. 7, the apparatus 600 includes: a team module 610, a determining module 620 and a photographing module 630.

The team module 610 is configured to form a team including the main terminal and the at least one member terminal based on a team photographing instruction initiated by the main terminal.

The determining module 620 is configured to, based on a target object to be photographed determined by the main terminal, determine the target object to be photographed of the at least one member terminal.

The photographing module 630 is configured to control, by the main terminal, the main terminal and the at least one member terminal to photograph the target object to be photographed cooperatively.

In some embodiments, the team module 610 is configured to form the team including the main terminal and the at least one member terminal based on the team photographing instruction initiated by the main terminal by: registering, by the main terminal, a team recognition identifier; and forming the team including the main terminal and the at least one member terminal based on the team recognition identifier.

In some embodiments, the determining module 620 is configured to, based on the target object to be photographed determined by the main terminal, determine the target object to be photographed of the at least one member terminal by: determining the target object to be photographed of the at least one member terminal based on the target object to be photographed determined by the main terminal and a preview image of the target object to be photographed by the at least one member terminal.

In some embodiments, the determining module 620 is configured to, based on the target object to be photographed determined by the main terminal and the preview image of the target object to be photographed by the at least one member terminal, determine the target object to be photographed of the at least one member terminal by: establishing a Gaussian mixture model based on a preview image of the target object to be photographed by the main terminal; and based on the Gaussian mixture model and the preview image of the target object to be photographed by the at least one member terminal, determining the target object to be photographed of the at least one member terminal.

Figure 8:
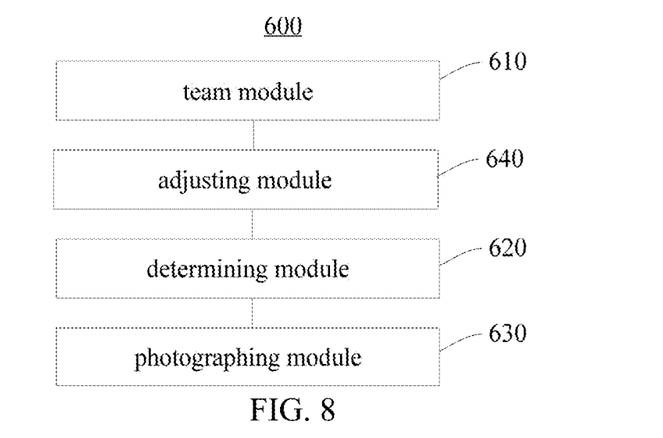
FIG. 8 is a block diagram illustrating a team photographing apparatus according to some other embodiments of the present disclosure.

FIG. 8 is a block diagram illustrating a team photographing apparatus according to some other embodiments of the present disclosure. As illustrated in FIG. 8, the photographing apparatus 600 for the team also includes an adjusting module 640.

The adjusting module 640 is configured to, after the team including the main terminal and the at least one member terminal is formed, share, by the at least one member terminal, the preview image photographed by the at least one member terminal to the main terminal, to select, by the main terminal, the preview image photographed by the at least one member terminal, and to adjust, by the main terminal, a photographing parameter of the at least one member terminal.

Figure 9:
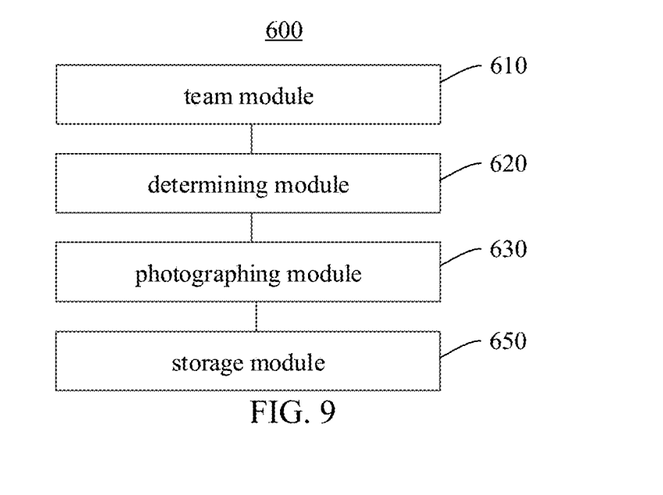
FIG. 9 is a block diagram illustrating a team photographing apparatus according to some other embodiments of the present disclosure.

FIG. 9 is a block diagram illustrating a team photographing apparatus according to some other embodiments of the present disclosure. As illustrated in FIG. 9, the photographing apparatus 600 for the team also includes a storage module 650.

The storage module 650 is configured to take the team including the main terminal and the at least one member terminal as a unit, and to store a plurality of images of the target object photographed by the team in a group.

In some embodiments, the storage module 650 is configured to take the team including the main terminal and the at least one member terminal as the unit and to store the plurality of images of the target object photographed by the team in the group by: based on the plurality of images of the target object photographed by the main terminal and the at least one member terminal, generating a universal unique identification code corresponding to each of the plurality of images; and storing the plurality of images of the target object photographed by the team in the group based on the universal unique identification code.

With the apparatus in the above-mentioned embodiment, the detailed implementation in which each module performs operations is described in embodiments related to the method.

Figure 10:
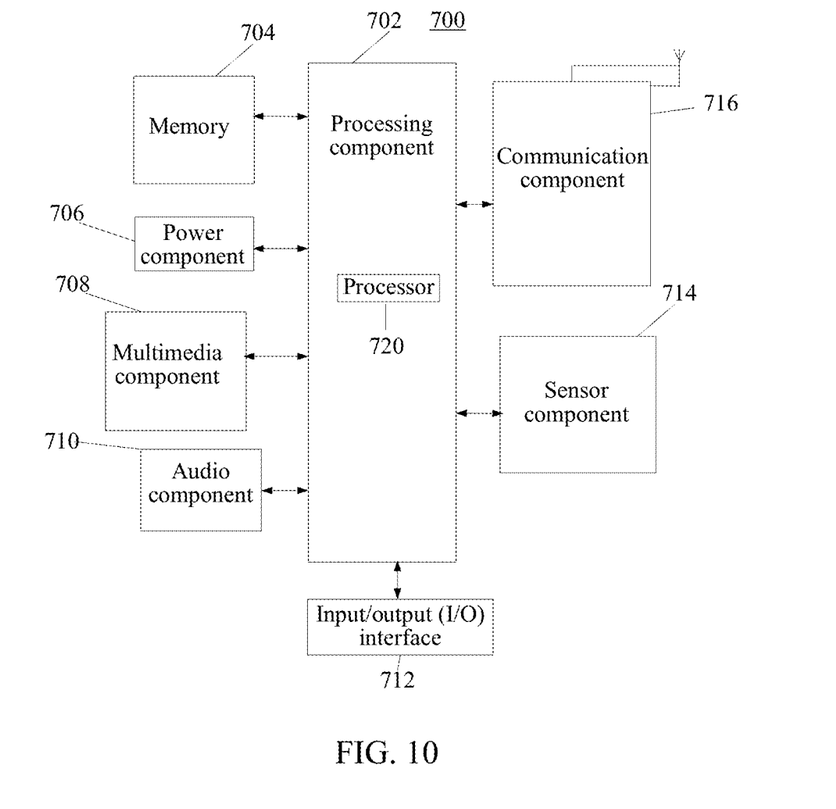
FIG. 10 is a block diagram illustrating an apparatus according to some embodiments of the present disclosure.

FIG. 10 is a block diagram illustrating a photographing apparatus 700 for a team according to some embodiments of the present disclosure. For example, the apparatus 700 can be a mobile phone, a computer, a digital broadcasting terminal, a message sending and receiving equipment, a game controller, a tablet device, a medical device, a fitness equipment, a personal digital assistant or the like.

Referring to FIG. 10, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but be not limited to, a home button, a volume button, a starting button, and a locking button.

The sensor component 714 includes one or more sensors to provide status assessments of various aspects of the apparatus 700. For example, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 may access a wireless network based on a communication standard, such as Wi-Fi, 2G, or 3G, or a combination thereof. In one example embodiment, the communication component 716 receives a broadcast signal or broadcast associated information from an external broadcast management system via a broadcast channel. In one example embodiment, the communication component 716 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In one or more example embodiments, the apparatus 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more example embodiments, there is also provided a non-transitory computer-readable storage medium including instructions, such as included in the memory 704, executable by the processor 720 in the apparatus 700, for performing the above-described methods. For example, the non-transitory computer-readable storage medium can be a ROM, a RAM, a CD-ROM, a magnetic tape, a floppy disc, an optical data storage device, and the like.

With the non-transitory computer-readable storage medium, when instructions stored in the storage medium are executed by a processor of a mobile terminal, the mobile terminal is caused to perform any photographing method as described above.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A team photographing method, applied to terminals, wherein the terminals comprise a main terminal and at least one member terminal, and the method comprises:
    forming a team comprising the main terminal and the at least one member terminal based on a team photographing instruction initiated by the main terminal;
    based on a target object to be photographed determined by the main terminal, determining the target object to be photographed of the at least one member terminal; and
    controlling, by the main terminal, the main terminal and the at least one member terminal to photograph the target object to be photographed;
    wherein said based on the target object to be photographed determined by the main terminal, determining the target object to be photographed of the at least one member terminal comprises:
    determining the target object to be photographed of the at least one member terminal based on the target object to be photographed determined by the main terminal and a preview image of the target object to be photographed by the at least one member terminal;
    wherein the determining the target object to be photographed of the at least one member terminal based on the target object to be photographed determined by the main terminal and the preview image of the target object to be photographed by the at least one member terminal comprises:

establishing a Gaussian mixture model based on a preview image of the target object to be photographed by the main terminal; and based on the Gaussian mixture model and the preview image of the target object to be photographed by the at least one member terminal, determining the target object to be photographed of the at least one member terminal.

2. The method of claim 1, wherein the forming the team comprising the main terminal and the at least one member terminal based on the team photographing instruction initiated by the main terminal comprises:

registering, by the main terminal, a team recognition identifier; and forming the team comprising the main terminal and the at least one member terminal based on the team recognition identifier.

3. The method of claim 1, further comprising:

with the team comprising the main terminal and the at least one member terminal, storing a plurality of images of the target object photographed by the team in a group.

4. The method of claim 3, wherein, said with the team comprising the main terminal and the at least one member terminal, storing the plurality of images of the target object photographed by the team in the group comprises:

based on the plurality of images of the target object photographed by the main terminal and the at least one member terminal, generating a universal unique identification code corresponding to each of the plurality of images; and storing the plurality of images of the target object photographed by the team in the group based on the universal unique identification code.

5. A team photographing apparatus, applied to terminals, wherein the terminals comprise a main terminal and at least one member terminal, and the apparatus comprises:

one or more processors;

memory storing instructions executable by the one or more processors;

wherein the one or more processors are configured to:

form a team comprising the main terminal and the at least one member terminal based on a team photographing instruction initiated by the main terminal;

based on a target object to be photographed determined by the main terminal, determine the target object to be photographed of the at least one member terminal; and control, by the main terminal, the main terminal and the at least one member terminal to photograph the target object to be photographed;

wherein the one or more processors are configured to, based on the target object to be photographed determined by the main terminal, determine the target object to be photographed of the at least one member terminal by performing:

determining the target object to be photographed of the at least one member terminal based on the target object to be photographed determined by the main terminal and a preview image of the target object to be photographed by the at least one member terminal;

wherein the one or more processors are configured to, based on the target object to be photographed determined by the main terminal and the preview image of the target object to be photographed by the at least one member terminal, determine the target object to be photographed of the at least one member terminal by performing:

establishing a Gaussian mixture model based on a preview image of the target object to be photographed by the main terminal; and based on the Gaussian mixture model and the preview image of the target object to be photographed by the at least one member terminal, determining the target object to be photographed of the at least one member terminal.

6. The apparatus of claim 5, wherein the one or more processors are configured to form the team comprising the main terminal and the at least one member terminal based on the team photographing instruction initiated by the main terminal by performing:

registering, by the main terminal, a team recognition identifier; and forming the team comprising the main terminal and the at least one member terminal based on the team recognition identifier.

7. The apparatus of claim 5, wherein the one or more processors are further configured to:

with the team comprising the main terminal and the at least one member terminal, store a plurality of images of the target object photographed by the team in a group.

8. The apparatus of claim 7, wherein the one or more processors are configured to store the plurality of images of the target object photographed by the team in the group with the team comprising the main terminal and the at least one member terminal by performing:

based on the plurality of images of the target object photographed by the main terminal and the at least one member terminal, generating a universal unique identification code corresponding to each of the plurality of images; and storing the plurality of images of the target object photographed by the team in the group based on the universal unique identification code.

9. A non-transitory computer readable storage medium, wherein when instructions in the storage medium are executed by a processor of a mobile terminal, the mobile terminal is configured to execute a team photographing method, and the team photographing method comprises:

forming a team comprising the main terminal and the at least one member terminal based on a team photographing instruction initiated by the main terminal;

based on a target object to be photographed determined by the main terminal, determining the target object to be photographed of the at least one member terminal; and controlling, by the main terminal, the main terminal and the at least one member terminal to photograph the target object to be photographed;

wherein said based on the target object to be photographed determined by the main terminal, determining the target object to be photographed of the at least one member terminal comprises:

determining the target object to be photographed of the at least one member terminal based on the target object to be photographed determined by the main terminal and a preview image of the target object to be photographed by the at least one member terminal;

wherein the determining the target object to be photographed of the at least one member terminal based on the target object to be photographed determined by the main terminal and the preview image of the target object to be photographed by the at least one member terminal comprises:
establishing a Gaussian mixture model based on a preview image of the target object to be photographed by the main terminal; and
based on the Gaussian mixture model and the preview image of the target object to be photographed by the at least one member terminal, determining the target object to be photographed of the at least one member terminal.

10. A team photographing system implementing the method of claim 1, comprising a plurality of terminals,
wherein upon any one of the plurality of terminals is configured as the main terminal, remaining of the plurality of terminals is/are configured as the at least one member terminal, and
wherein the main terminal is configured to share a team id to the at least one member terminal, so as to form the team, through a social communication application or software, or by generating a two-dimensional code of the team id to enable the at least one member terminal to join the team of the main terminal by scanning the two-dimensional code.

11. The team photographing system of claim 10, wherein the plurality of terminals are configured to photograph the target object cooperatively from a plurality of different angles.

12. The team photographing system of claim 11, wherein main terminal is configured to browse the preview image of the at least one member terminal to control the at least one member terminal to photograph the same target object cooperatively with the main terminal.

13. The team photographing system of claim 12, wherein the main terminal is configured to:
establish the Gaussian mixture model based on the preview image of the target object photographed by the main terminal;
determine the target object to be photographed for the at least one member terminal based on the Gaussian mixture model and the preview image of the target object to be photographed by the at least one member terminal;
based on the target object to be photographed determined by the main terminal and the preview image for determining the target object to be photographed, perform semantic segmentation on the preview image, wherein the semantic segmentation comprises dividing visual input into different semantics, to distinguish different target objects in the preview image.

14. The team photographing system of claim 13,
wherein the Gaussian mixture model is configured to establish an image pixel feature model of the target object to be photographed; and
wherein a parameter formula of the Gaussian mixture model is represented by:

$$p(x)=\Sigma_{k=1}^{K}\pi_k \mathcal{N}(x|\mu_k,\Sigma_k), \Sigma_{k=1}^{K}\pi_k=1,$$

wherein, $p(x)$ represents a sum of probability distributions of colors k (k=1, 2, . . . , K) in the target object to be photographed multiplied by a coefficient $\Sigma_k$ representing a proportion of a color distribution in color distributions of the target object to be photographed, K represents number of color clusters in the target object to be photographed, $\mu_k$ represents μ mean value of a color x in a Gaussian mixture distribution, and $\Sigma_k$ represents a variance of the color x;
the target object to be photographed of the at least one member terminal is determined based on the Gaussian mixture model;
the preview image of the member terminal for the target object to be photographed is divided to into a plurality of regions corresponding to different objects in the preview image;
an average confidence value of pixels in each region in the preview image of the target object to be photographed determined by the at least one member terminal belonging to the target object to be photographed determined by the main terminal is calculated;
a region corresponding to a maximum value of the average confidence values is determined as a region in the preview image of the target object to be photographed by the at least one member terminal corresponding to the target object to be photographed determined by the main terminal;
a centroid of a geometric shape corresponding to the region is calculated, and a position of the centroid is determined as position of the target object to be photographed by the at least one member terminal; and
the at least one member terminal is configured perform point focusing on the target object to be photographed based on the received position of the centroid.

* * * * *